(12) United States Patent
Ohnari

(10) Patent No.: US 7,261,283 B1
(45) Date of Patent: Aug. 28, 2007

(54) SWING TYPE FINE AIR BUBBLE GENERATING DEVICE

(76) Inventor: Hirofumi Ohnari, 15-20, Jyogaoka 3-chome, Tokuyama-shi, Yamaguchi 745-0807 (JP)

( * ) Notice: Subject to any disclaimer, the term of this patent is extended or adjusted under 35 U.S.C. 154(b) by 0 days.

(21) Appl. No.: 09/743,531

(22) PCT Filed: May 15, 2000

(86) PCT No.: PCT/JP00/03089

§ 371 (c)(1),
(2), (4) Date: Jun. 5, 2001

(87) PCT Pub. No.: WO00/69550

PCT Pub. Date: Nov. 23, 2000

(30) Foreign Application Priority Data

May 15, 1999 (JP) .................................. 11-171491

(51) Int. Cl.
*B01F 3/04* (2006.01)
(52) U.S. Cl. ............................... 261/79.2; 261/DIG. 75
(58) Field of Classification Search ............... 261/79.2, 261/79.1, DIG. 75
See application file for complete search history.

(56) References Cited

U.S. PATENT DOCUMENTS

| 2,353,912 | A | * | 7/1944 | Lindsey ....................... 261/79.2 |
|---|---|---|---|---|
| 2,653,801 | A | * | 9/1953 | Fontein et al. ............. 261/79.2 |
| 3,238,021 | A | * | 3/1966 | Webber et al. ............. 261/79.2 |
| 3,890,655 | A | * | 6/1975 | Mathis ......................... 4/541.6 |
| 3,946,993 | A | * | 3/1976 | Morlin ....................... 261/79.2 |
| 4,292,259 | A | * | 9/1981 | Roth et al. .................. 261/123 |
| 4,389,312 | A | * | 6/1983 | Beard .................. 261/DIG. 75 |
| 4,726,686 | A | * | 2/1988 | Wolf et al. ................. 261/79.2 |
| 4,834,343 | A | * | 5/1989 | Boyes ................. 261/DIG. 75 |
| 5,004,484 | A | * | 4/1991 | Stirling et al. ....... 261/DIG. 75 |
| 5,059,357 | A | * | 10/1991 | Wolf et al. ................. 261/79.2 |
| 5,350,543 | A | * | 9/1994 | Spradley .............. 261/DIG. 75 |
| 5,441,482 | A | * | 8/1995 | Clague et al. ................. 604/35 |
| 6,382,601 | B1 | * | 5/2002 | Ohnari ....................... 261/79.2 |

* cited by examiner

*Primary Examiner*—Scott Bushey
(74) *Attorney, Agent, or Firm*—Kratz, Quintos & Hanson, LLP

(57) ABSTRACT

The swirling type micro-bubble generating system according to the present invention possesses a container main unit having a cylindrical space with bottom or a frusto-conically shaped space, a liquid inlet provided in a tangential direction on a part of a circumferential surface of an inner wall of said space, a gas introducing hole provided on the bottom of said cylindrical space or opening of said frusto-conically shaped space, and a swirling gas-liquid mixture outlet arranged at the opposite end of said cylindrical space or opening of said frusto-conically shaped space. According to this system, it is possible to readily generate micro-bubbles in an industrial scale, and the system is relatively small in size and has simple structure and can be easily manufactured. The system can be used in applications such as purification of water quality in ponds, lakes, marshes, man-made lakes, rivers, etc., for processing of polluted water using microorganisms, culture of fishes and other aquatic animals, and increase of oxygen and dissolved oxygen in culture solution in hydroponics culture farm and improvement of production yield.

6 Claims, 6 Drawing Sheets

SWING TYPE FINE AIR BUBBLE GENERATING DEVICE

This application is the national stage filing of PCT/JP00/03089, filed under 35 U.S.C. 371 on May 15, 2000. The international application claims benefit of priority under 35 U.S.C. 119 to JP 11-171491 filed May 15, 1999.

FILED OF THE INVENTION

The present invention relates to a micro-bubble generating system for efficiently dissolving gas such as the air, oxygen gas, etc. into liquid such as city water, river water, etc., for purifying polluted water and for effectively utilizing the water for reconditioning and renewal of water environment.

BACKGROUND ART

In conventional type aeration systems, e.g., in most aeration systems using a micro-bubble generating system installed for culture and growth of aquatic animals, air bubbles are generated by injecting the air under pressure into water through fine pores of tubular or planar micro-bubble generating systems installed in the tank, or air bubbles are generated by introducing the air into water flow with shearing force or by vaporizing the air dissolved in water by rapidly reducing the pressure of the pressurized water.

In the aeration process using the micro-bubble generating system with the above functions, the operation is basically controlled by adjusting the air supply quantity or the number of the micro-bubble generating systems to be installed, while it is necessary to efficiently dissolve gas such as air, carbon dioxide, etc. into water and further to promote circulation of the water.

However, in the aeration system using the conventional type micro-bubble generating system, e.g. a diffusion system based on injection, even when fine pores are provided, when air bubbles are injected under pressure through pores, the volume of each of the air bubbles is expanded, and the diameter of each air bubble is increased to several millimeters due to surface tension of the air bubbles during injection. Thus, it is difficult to generate air bubbles of smaller diameter. Also, there are problems, such as clogging of the pores or increases of power consumption caused by the operation for long time.

In the system to generate the air bubbles by introducing the air into water flow with shearing force using vanes and an air bubble jet steam, it is necessary to have higher number of revolutions to generate cavitation. Also, there are problems of power consumption increase and the problem of corrosion of vanes or vibration caused by the generation of cavitation. Further, there are problems in that only a small amount of micro-bubbles can be generated.

In the system where a gas-liquid two-phase flow collides with the moving vane or projection, fishes or small aquatic animals in natural lakes or culture tanks may be injured, and this causes trouble in the development and maintenance of the environmental condition necessary for the growth of fishes and other aquatic animals.

Further, in the pressurizing system, the system must be designed in larger size and requires higher costs, and operation cost is also high.

In none of the prior art in this field, as described above, has it been possible to generate micro-bubbles with diameters of not more than 20 μm in industrial scale.

DISCLOSURE OF THE INVENTION

After fervent study efforts, the present inventors have successfully developed the present invention, by which it is possible to generate micro-bubbles with diameters of not more than 20 μm in industrial scale.

Specifically, the present invention provides:

(1) a swirling type micro-bubble generating system, comprising a container main unit having a cylindrical space with a bottom at one end, a pressurized liquid inlet provided in a tangential direction communicating with a part of the circumferential surface on the inner wall of the space, a gas introducing hole opening in the bottom of the cylindrical space, and a swirling gas-liquid mixture outlet arranged at the other end of the cylindrical space;

(2) a swirling type micro-bubble generating system, comprising a container main unit having a frusto-conically shaped space with a closed inlet at one end, a pressurized liquid inlet provided in a tangential direction communicating with a part of the circumferential surface on the inner wall of the space, a gas introducing hole opening in the inlet of the frusto-conically shaped space, and a swirling gas-liquid mixture outlet arranged at the other end of the space.

(3) a swirling type micro-bubble generating system according to (1) or (2) above, wherein a plurality of pressurized liquid tangentially directed inlets are provided circumferentially spaced about a part of the circumferential surface on the inner wall of the space;

(4) a swirling type micro-bubble generating system according to one of (1) to (3) above, wherein the pressurized liquid inlet is provided on a part of the circumferential surface of the inner wall near the other end of the space;

(5) a swirling type micro-bubble generating system according to one of (1) to (4) above, wherein the pressurized liquid inlet is provided on a part of the circumferential surface of the inner wall near a point halfway between the ends of the space; and (6) a swirling type micro-bubble generating system according to one of (1) to (5) above, wherein a baffle plate is arranged immediately before the swirling gas-liquid mixture outlet opened at the other end of the cylindrical space.

(7) a swirling type micro-bubble generating system comprising a partition plate for blocking said outlet, leaving only a partial opening, said partition plate being attached immediately before the swirling gas-liquid mixture outlet opened at the other end of the cylindrical space.

(8) a method for swirling type micro-bubble generation, using a micro-bubble generating system, which comprises a container main unit having a cylindrical space with a bottom at one end, a pressurized liquid introducing port opening in a tangential direction on a part of the circumferential surface of the inner wall of said cylindrical space, and a swirling gas-liquid discharge outlet at the other end of said cylindrical space, whereby said method comprises a first step of forming a swirling gas cavity swirling and flowing while being extended and narrowed down in said cylindrical space, and a second step of generating micro-bubbles when the swirling gas cavity is forcibly cut off and smashed due to the difference of swirling velocity between the portions of the swirling gas cavity.

(9) a method for swirling type micro-bubble generation, using a micro-bubble generating system, which comprises a container main unit having a cylindrical space with a bottom at one end, a pressurized liquid inlet opening in a tangential direction on a part of the circumferential surface of the inner wall of said space, a gas introducing hole opened at the bottom end of said cylindrical space, and a swirling gas-liquid mixture outlet opened at the other end of said cylindrical space, whereby said method comprises:

a first step of forming a swirling gas cavity for swirling and guiding while extending and narrowing down self-sucking gas in said cylindrical space;

a second step of generating micro-bubbles when the swirling gas cavity is forcibly cut off and smashed due to the difference of swirling velocity in said swirling gas cavity; and a third step of continuously and steadily cutting off and smashing said swirling gas cavity in said cylindrical space, whereby the fluid passing through the rotating cut-off portion is rapidly expanded in conical shape while rotating (where a fluid not containing micro-bubbles flowing from outside is filled in the rotating fluid expanding in conical shape) said rotating fluid expanding in conical shape being stable formed, and an expanded angle of the conical shape is large (about 90°), and the difference of rotating velocity in the rotating cut-off portion and the smashed portion in the second step is relatively increased.

BEST MODE FOR CARRYING OUT THE INVENTION

Figure 1:
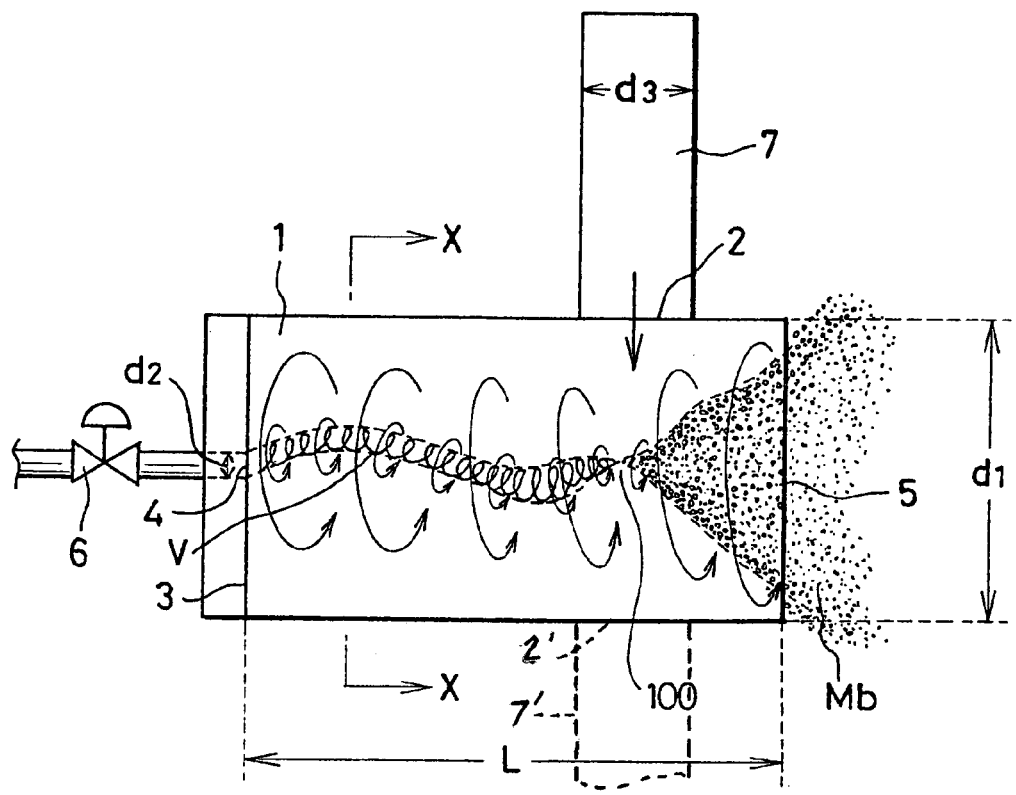
FIGS. 1(a) and 1(b) are a front view and a side view, respectively, of a swirling type micro-bubble generating system of an embodiment of the present invention.
Figure 1:
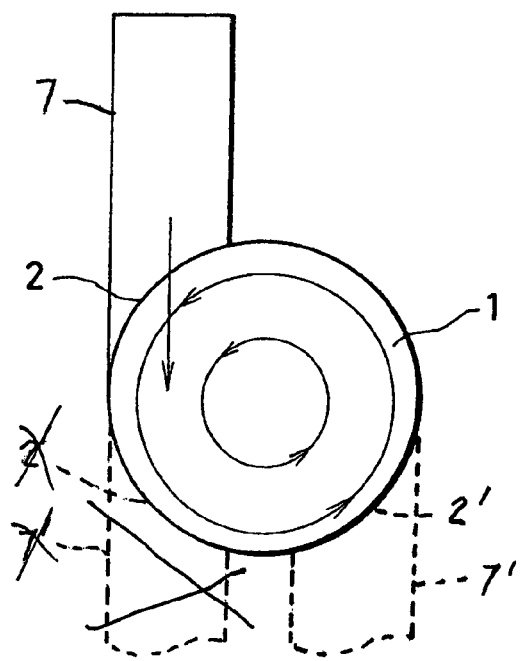

As shown in the drawings to explain the principle of the present invention in FIG. 1, a micro-bubble generating system comprises a cylindrical space 1 with bottom 3 formed in a container of the system, a pressurized liquid inlet 2 provided in a tangential direction on a part of the circumferential surface of the inner wall of the space, a gas introducing hole 4 arranged at the center of the bottom 3 of the cylindrical space, and a swirling gas-liquid mixture outlet 5 arranged near the other end of the cylindrical space 1.

FIG. 1 (a) is a side view, and FIG. 1(b) is a sectional view along the line X-X of FIG. 1(a).

The main unit of the system or at least the swirling gas-liquid mixture outlet 5 is submerged in the liquid. By forcibly sending the pressurized liquid from a pressure liquid inlet pipe 7 into the cylindrical space 1 through the pressurized liquid introducing hole 2, a swirling flow is generated in the space, and a portion with negative pressure is generated near the axis of the cylindrical pipe. If desired, more than one pressure liquid inlet pipe can be used to introduce pressure liquid into the cylindrical space through additional pressure liquid inlet pipes and inlet openings, as shown in phantom by the elements indicted by reference numerals 7' and 2', respectively, on circumferential spacing about the wall of the unit.

By this negative pressure, the gas is sucked through the gas introducing hole 4. When the gas passes in the vicinity of the axis of the pipe where the pressure is at the lowest, a swirling gas cavity V in shape of fine string is generated.

In the cylindrical space 1, when the swirling liquid-gas mixed flow passes from the bottom 3 of the space to the pressure liquid introducing hole 2, the swirling gas cavity V in the shape of a string is generated. This is reduced in diameter and narrowed down and torn down to generate micro-bubbles. Then, it is sent toward the swirling gas-liquid mixture outlet 5 and is discharged while swirling.

In association with the swirling, due to the difference of specific gravity between the liquid and the gas, centrifugal force is applied on the liquid and centripetal force is applied on the gas at the same time. As a result, the liquid portion and the gas portion become separable from each other. The gas is formed in string-like shape and continues to flow near the liquid introducing hole 2 of the central line of the cylindrical space 1. Then the swirling is rapidly weakened. Further, it is reinforced by the rotating flow introduced through the liquid introducing hole. Then, when rotating flow in conical shape is formed downstream, the rotating velocity of this portion is rapidly decreased.

Before and after the portion 100 in FIG. 1(a), a big difference of rotating velocity is generated. As a result, the gas cavity V in string-like shape is continuously and steadily cut off. Then, micro-bubbles Mb, e.g. micro-bubbles of 10-20 μm in diameter, are generated near the swirling gas-liquid mixture outlet 5, and these are discharged into the liquid outside of the system.

Normally, the system main unit of the present invention, or at least the swirling gas-liquid mixture outlet 5, is installed in the liquid.

Figure 2:
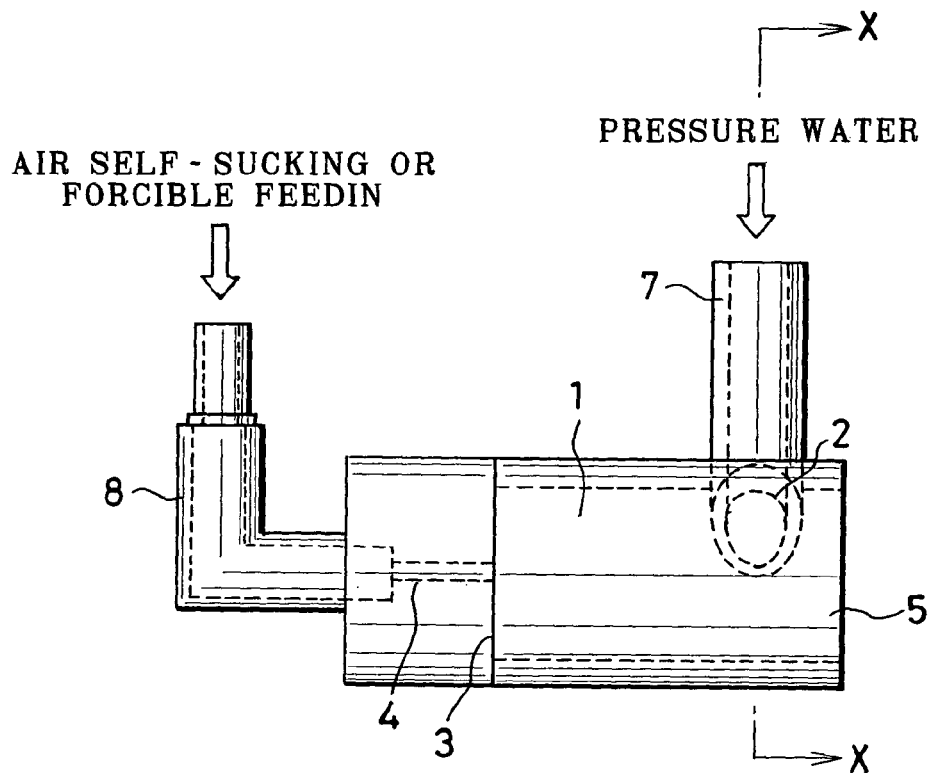
FIGS. 2(a) and 2(b) are drawings to explain the principle of the present invention and also to explain a system of another embodiment of the present invention.
Figure 2:
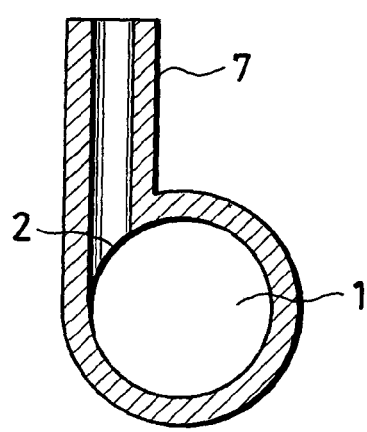

FIG. 2 is a drawing to explain the principle of the present invention, also serving to explain a system of an embodiment. FIG. 2(a) is a side view, and FIG. 2(b) is a sectional view along the line X-X of FIG. 2(a).

A gas introducing pipe 8 for introducing the gas is connected to the forward end of the gas introducing hole 4, and there is provided liquid inlet pipe 7 for supplying liquid (e.g. pressurized water) to the liquid inlet 2.

Also, a liquid inlet 2 is opened in a tangential direction on the circumferential surface of the inner wall of the cylindrical space 1.

Figure 3:
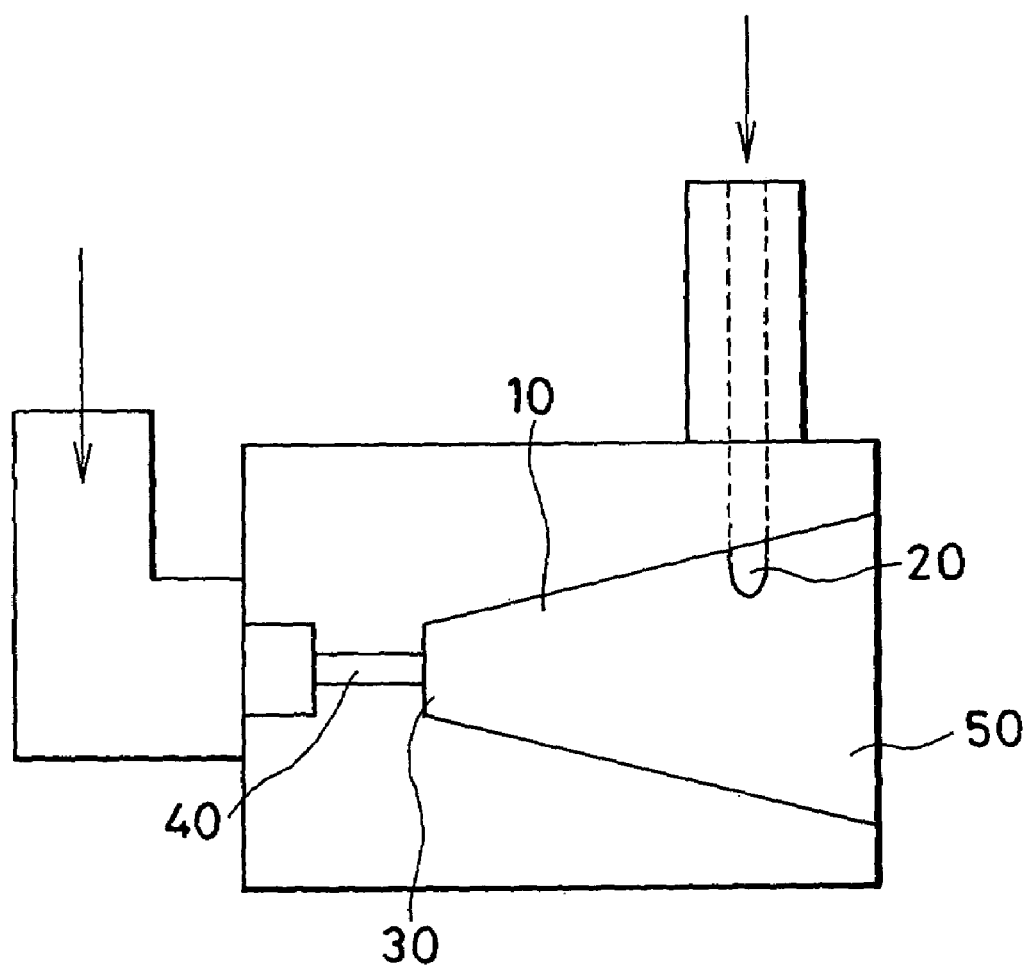
FIG. 3 is a drawing to explain a system of another modified embodiment of the invention.

According to another aspect of the intention, as shown in FIG. 3, a system with a frusto-conically shaped space 10 is proposed.

The system comprises a container main unit having a space 10 with the inlet end closed, a liquid inlet 20 in tangential direction on a part of circumferential surface of inner wall of the space 10, a gas introducing hole 40 on an opening 30 in the closed end of the space, and a swirling gas-liquid mixture outlet 50 opened at the top of the megaphone-shaped space 10.

There are different cases: the case where the main unit of the system is installed under the water surface, the case where it is installed outside and in contact with a water tank, and a case where it is installed on a faucet of water works.

Accordingly to the present invention, water is normally used as the liquid and the air is used as the gas. In addition, the liquid may include a solvent such as toluene, acetone, alcohol, etc., fuel such as petroleum, gasoline, etc., foodstuff such as edible oil, butter, ice cream, beer, etc., drug preparation such as drug containing beverage, health care product such as bath liquid, environmental water such as water of lake or marsh, or polluted water from sewage purifier, etc. Further, the gas may include inert gas such as hydrogen, argon, radon, etc., oxidizing agent such as oxygen, ozone, etc., acidic gas such as carbon dioxide, hydrogen chloride, sulfurous acid gas, nitrogen oxide, hydrogen sulfide, etc., and alkaline gas such as ammonia.

From the gas introducing hole 4, the gas is automatically sucked in (self-sucked), and the gas is incorporated into the swirling liquid gas mixed flow as the swirling cavity V of string-like shape.

The gas swirling cavity V of string-like shape at the central portion and the liquid swirling flow around it are injected through the outlet 5. At the same time as this injection, the swirling is rapidly weakened by static liquid in the surrounding region because a radical difference of swirling velocity occurs. Then, the gas cavity V in a string-like shape at the center of the swirling flow is continuously and steadily cut off. As a result, a large quantity of micro-bubbles, e.g. micro-bubbles of 10 to 20 μm in diameter, are generated near the outlet 5.

In FIG. 1, the relationship of bore diameter $d_1$ of the swirling gas-liquid mixture outlet 5, bore diameter $d_2$ of the gas introducing hole 4, bore diameter $d_3$ of the pressure liquid introducing pipe, and the distance L between the swirling gas-liquid mixture outlet 5 and the bottom 3 of the cylindrical space can be given as:

$L \approx 0.5$ to $3.0 \times d_1$

The range of the numerical values due to the difference of the type of system is as follows:

|  | $d_1$ | $d_2$ | $d_3$ | L |
| --- | --- | --- | --- | --- |
| Mini-size system | 0.5 cm or less | 0.3~0.8 mm | 0.5 cm or less | 0.5~1.5 cm |
| Small-size system | 0.5~2.0 cm | 0.5~1.0 mm | 0.5~1.0 cm | 1.0~6.0 cm |
| Medium-size system | 2.0~5.0 cm | 1.0~1.5 mm | 1.0~2.0 cm | 1.0~15 cm |
| Large-size system | 5 cm or more | 1.0~2.0 mm | 2 cm or more | 15 cm or more |

In a case of a medium-size system, e.g. the pump has a motor of 200-400 W, discharge volume of 40 liters/min., and lift of 15 m. Using this, a large quantity of micro-bubbles can be generated. Over the entire water surface in a water tank with volume of 5 m$^3$, micro-bubbles of about 1 cm in thickness were accumulated during operation. This system could be used for purification of water in a pond with volume of 2000 m$^3$ or more.

In a small-size system, for example, the pump has a motor of 30 W, discharge of 20 liters/min. This system could be used in a water tank with a volume of 5 liters to 1 m$^3$.

When this system is applied for seawater, micro-bubbles can be very easily generated, and it is possible to further expand the application for use.

Figure 4:
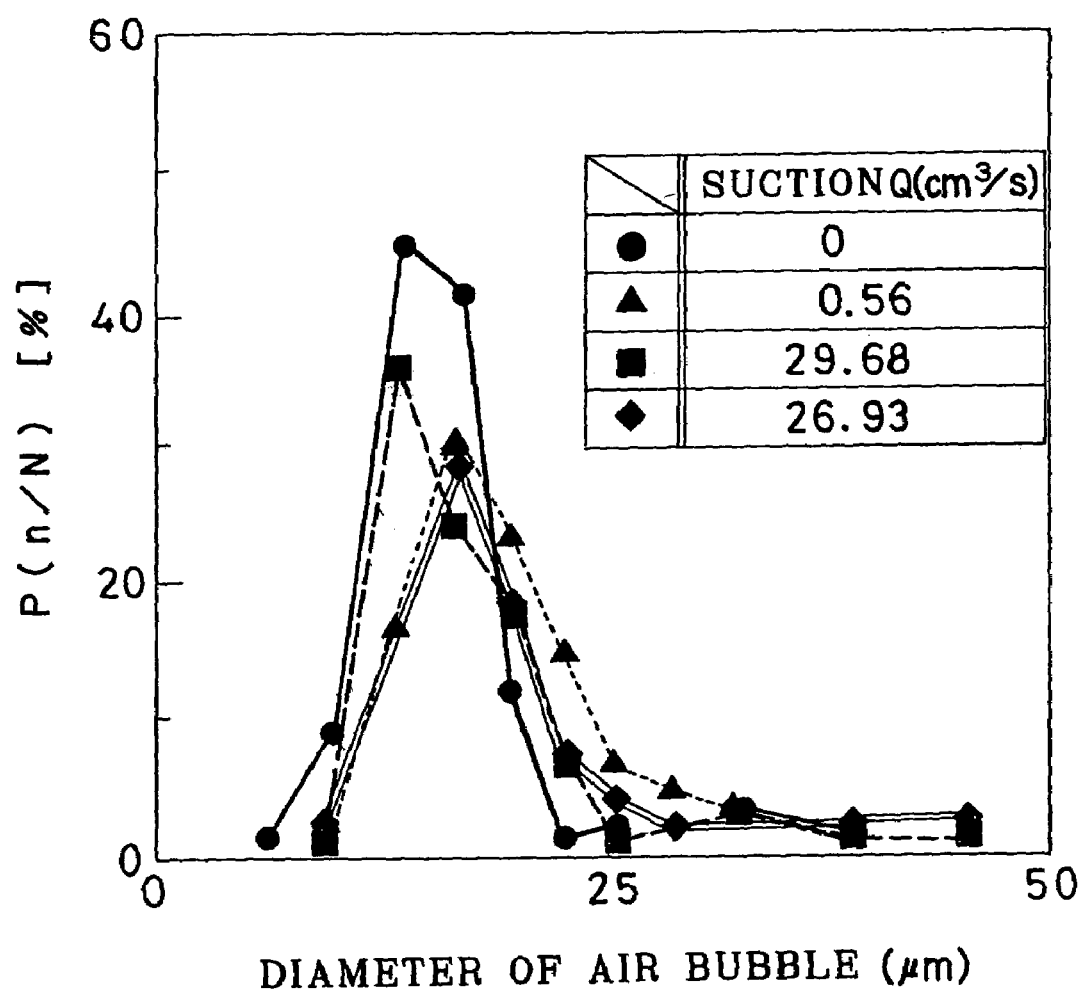
FIG. 4 is a graphic representation showing diameter of air bubbles and distribution of bubble generating frequency when a medium size system of the present invention is installed under water and micro-bubbles are generated using the air as gas.

FIG. 4 is a graphic representation of diameter of bubbles and distribution of bubble generating frequency when a medium-size system of the present invention is installed under water and micro-bubbles are generated using the air as gas. Also, the results are shown for the case where air suction volume from the gas introducing hole 4 is regulated. In this figure, even when air suction is set to 0 cm$^3$/s, bubbles of 10-20 μm in diameter are generated. This may be because by the fact that the air dissolved in water is separated and bubbles are generated. Therefore, the system of the present invention can also be used as a deaeration system of dissolved gas.

As described above, when the system of the present invention is installed in the liquid, and liquid (e.g. pressurized water) is supplied into the cylindrical space 1 from the liquid inlet 2 via the liquid inlet pipe 7 using a pump, and the gas introducing pipe 8 (e.g. air supply pipe), is connected to the gas introducing hole 4, micro-bubbles of 10-25 μm in diameter can be easily generated and supplied into the liquid (e.g. water).

The space as described above may not necessarily be in cylindrical shape. For example, a space with diameter gradually increased in one direction, e.g. a space of a frusto-conical shape as shown in FIG. 3 may be used.

The generation of bubbles can be controlled by regulation of a gas flow/rate regulating valve connected to the forward end of the gas introducing pipe 8., and optimal generation of micro-bubbles can be easily controlled. Further, bubbles having a diameter of more than 10-20 μm can be easily generated by regulating the valve.

Figure 5:
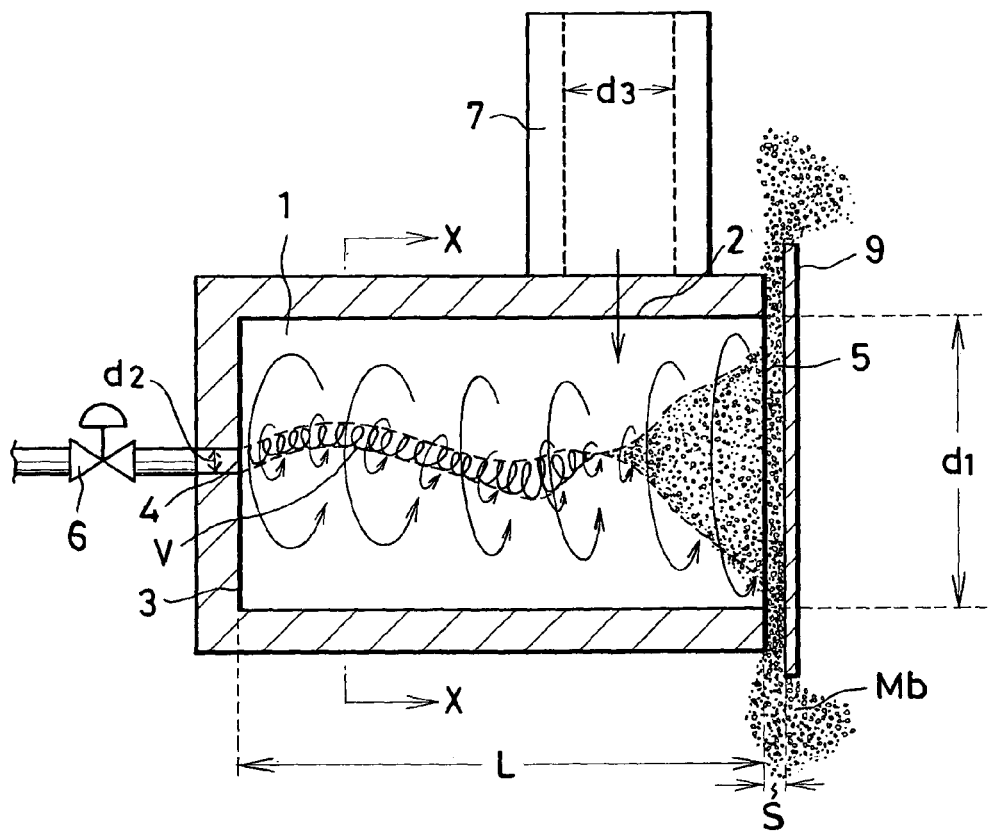
FIGS. 5(a) and 5(b) are drawings to explain a system of still another modified embodiment of the present invention.
Figure 5:
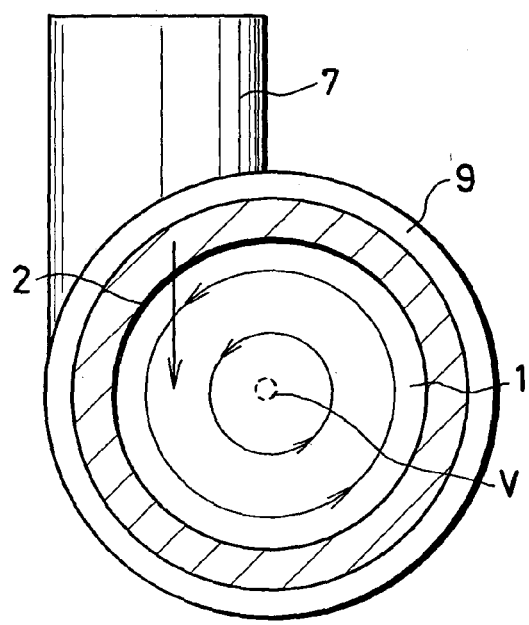

Further, in the present invention, it is preferable that a baffle plate 9 is arranged with a small spacing S immediately before the swirling gas-liquid mixture outlet 5 opened at the top of the cylindrical space 1 as shown in FIG. 5. In FIG. 5, FIG. 5(a) is a longitudinal sectional view, and FIG. 5(b) is a sectional view along the line X-X. A disk-like baffle plate 9 is disposed with a small spacing S of preferably 0.2 to 1.0 mm immediately before the swirling gas-liquid mixture outlet 5. As a result, micro-bubbles can be discharged out of the system steadily and in large quantity.

When the small space S is decreased, micro-bubbles are turned to finer bubbles, but discharge quantity is decreased. In this case, by supplying gas through the gas introducing hole 4, a large quantity of bubbles can be discharged.

Figure 6:
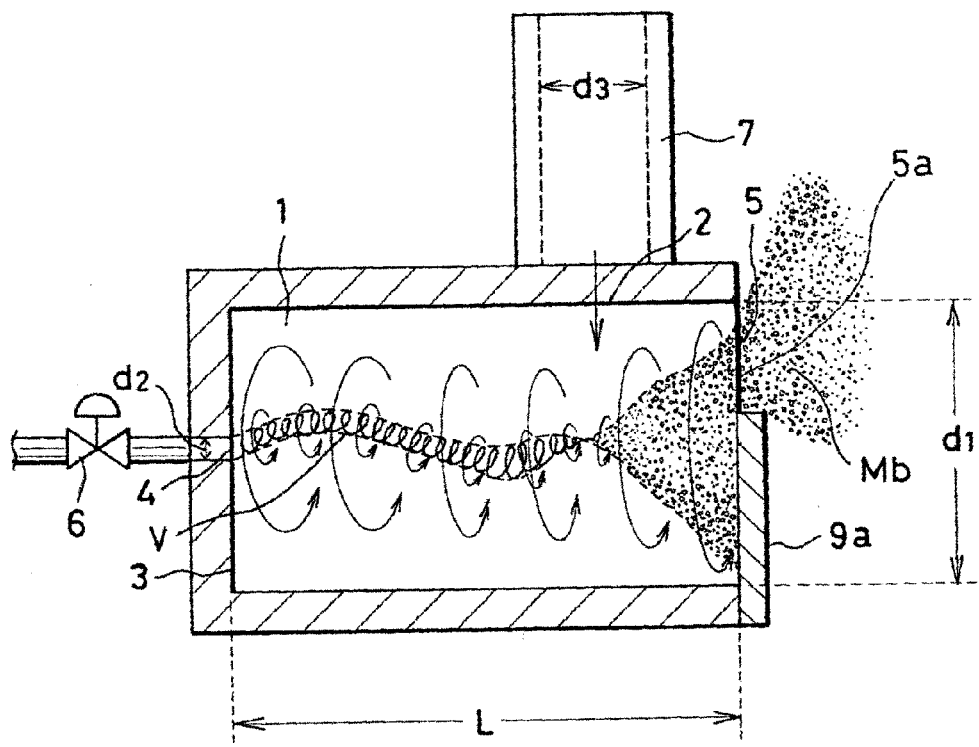
FIGS. 6(a) and 6(b) are drawings to explain a system of still another modified embodiment of the present invention.
Figure 6:
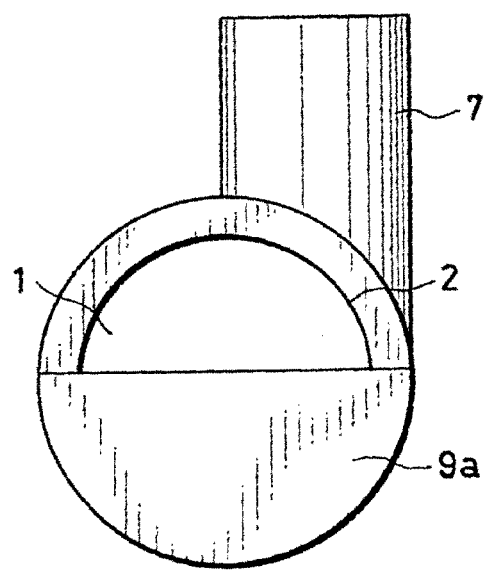

As shown in FIG. 6, it is preferable that a partition plate 9a may be attached immediately before the swirling gas-liquid mixture outlet 5 opened at the top of the cylindrical space 1, and the outlet 5 may be closed, leaving only a partial opening 5a. In FIG. 6, FIG. 6(a) is a longitudinal sectional view, and FIG. 6(b) is a side view seen from left. The partition plate 9a is attached under the swirling gas-liquid mixture outlet 5 leaving an opening 5a above the outlet. As a result, micro-bubbles can be discharged out of the system steadily and in large quantity.

In particular, micro-bubbles can be sufficiently generated even when the system shown in FIG. 5 and FIG. 6 is used at a place where high water pressure is applied.

The system of the present invention may be made of the materials such as plastics, metal glass, etc., and it is preferable that the components of the system are integrated together by bonding, screw connection, etc.

By the swirling type micro-bubble generating system of the present invention, it is possible to readily generate micro-bubbles in industrial scale. Because the system is relatively small in size and has simple construction it is easier to manufacture, and the system will contribute to purification of water in ponds, lakes, marshes, man-made lakes, rivers, etc., processing of polluted water using microorganisms, and culture of fishes and other aquatic animals.

Micro-bubbles generated by the system according to the present invention can be used in the following applications:
 (1) Purification of water quality in man-made lakes, natural lakes, ponds, rivers, sea, etc. and preservation of natural environment through growth of animals and microorganisms.
 (2) Purification of man-made and natural waters such as biotype and promotion of growth of fireflies, water weeds, etc.
 (3) Industrial application
  Diffusion of high temperature in steel manufacture.
  Promotion of acid cleaning of stainless steel plate and wires.
  Removal of organic substances in ultra-pure water manufacturing factory.
  Removal of organic substances in polluted water by micro-bubble formation of ozone, increase of dissolved oxygen, sterilization, manufacture of synthetic resin foam such as urethane foam product.

Processing of various types of waste water and liquid.

Sterilization by ethylene oxide, promotion of mixing of ethylene oxide with water in sterilizer.

Emulsification of defoaming agent.

Aeration of polluted water in activated sludge treatment method.

(4) Agricultural applications

Increase of oxygen and dissolved oxygen to be used in hydroponic culture, and improvement of production yield.

(5) Fisheries

Culture of eel

Maintenance of life in cuttlefish tank

Culture of yellowtail

Artificial development of seaweeds

Promotion of growth of fishes

Prevention of red tide (6) Medical applications

Use of micro-bubbles in hot bath to promote blood circulation and to maintain hot water in bath.

What is claimed is:

1. A micro-bubble generating system, comprising
a container main unit having an interior space of frusto-conical shape and being at least partly closed at one end by a bottom wall,
a pressurized liquid inlet opening communicating tangentially with said interior space,
a gas introducing hole opening at one end of said frusto-conical space at a center of the bottom wall to generate a swirling gas that is exposed to contact with swirling pressurized liquid introduced through said liquid inlet, and
a swirling gas-liquid mixture outlet opening at the other end of said interior space and operative to discharge micro-bubbles therefrom, said interior space having a largest bore diameter substantially equal to a bore diameter of said gas-liquid mixture outlet opening.

2. A method for micro-bubble generation, using a micro-bubble generating system, which comprises a container main unit having an interior space with a bottom wall, a pressurized liquid inlet opened in a tangential direction on a part of a circumferential surface of an inner wall of the space, a gas introducing hole opened at a center of the bottom wall of the interior space, and a swirling gas-liquid mixture outlet opened at a mixture discharge end of the interior space, whereby said method comprising the steps of:
forming a swirling gas cavity along which self-sucked gas is swirled and guided while flowing in a narrow stream of swirling gas flow in the interior space; and
generating micro-bubbles by forcibly cutting off and smashing the swirling gas cavity by contact with swirling pressurized liquid due to a difference of swirling velocity between the gas and liquid portions in the swirling gas cavity, said interior space having a largest bore diameter substantially equal to a bore diameter of said gas-liquid mixture outlet.

3. A method for micro-bubble generation, using a micro-bubble generating system, which comprises a container main unit having an interior space with a bottom wall, a pressurized liquid inlet opened in a tangential direction on a part of a circumferential surface of an inner wall of the space, a gas introducing hole opened at a center of the bottom wall of the interior space, and a swirling gas-liquid mixture outlet opened at a mixture discharge end of the interior space, whereby said method comprising the steps of:
forming a swirling gas cavity for swirling and guiding self-sucked gas along a narrow gas flow stream in the interior space;
generating micro-bubbles by forcibly cutting off and smashing the swirling gas cavity by contact with swirling pressurized liquid due to a difference of swirling velocity between portions in the swirling gas cavity; and
continuously cutting off and smashing the swirling gas cavity in said interior space due to a relative increase of the difference in rotating velocity between a rotating cut-off portion and smashing portion in the step of generating micro-bubbles, the liquid passing through the rotating cut-off portion of gas cavity being rapidly diffused while a diffused rotating gas-liquid mixture is stably formed and an angle of diffusion of the rotating mixture is large, and wherein a difference of rotating velocity between gas and liquid streams is relatively increased between the rotating cut-off portion and the smashing portion, said interior space having a largest bore diameter substantially equal to a bore diameter of said gas-liquid mixture outlet.

4. A micro-bubble generating system, comprising:
a container having an interior space defined by a surface of revolution,
a container bottom wall closing said space at one axial end thereof and a gas-liquid mixture outlet opening at the other end thereof, said interior space having a largest bore diameter substantially equal to a bore diameter of said gas-liquid mixture outlet opening,
a liquid inlet opening communicating tangentially with said interior space adjacent said gas-liquid mixture outlet opening,
means for injecting pressurized liquid through said liquid inlet opening as a centrifugally flowing liquid into said interior space,
a gas introducing hole disposed in a center of the container bottom wall and operative to introduce gas into said interior space, said stream of gas being induced to swirl as a narrow low pressure flow stream in said interior space by said centrifugally flowing liquid,
wherein said swirling pressurized liquid introduced through said pressurized liquid inlet contacts said narrow swirling gas flow stream adjacent said gas-liquid mixture outlet to tear down said swirling gas flow stream and thereby generate micro-bubbles for discharge from said gas-liquid mixture outlet opening.

5. A micro-bubble generating system according to one of claims 1 or 4, wherein a plurality of pressurized liquid inlet openings are tangentially disposed on a part of a circumferential surface of the container and communicate at spaced locations about the circumference of the container wall with the interior space.

6. A micro-bubble generating system according to one of claims 1 or 4, wherein said pressurized liquid inlet opening opens on a part of the circumferential surface of the container near said gas-liquid mixture outlet opening from said interior space.

* * * * *